(12) United States Patent
Swieconek

(10) Patent No.: US 6,980,725 B1
(45) Date of Patent: Dec. 27, 2005

(54) SPACE REUSE DURING TECHNOLOGY UPGRADE IN A PROTECTION AREA OF AN OUTDOOR ENCLOSURE

(75) Inventor: Paul D. Swieconek, Petamula, CA (US)

(73) Assignee: Calix Networks, Inc., Petaluma, CA (US)

( * ) Notice: Subject to any disclaimer, the term of this patent is extended or adjusted under 35 U.S.C. 154(b) by 227 days.

(21) Appl. No.: 10/137,210

(22) Filed: Apr. 30, 2002

(51) Int. Cl.⁷ ................................................ G02B 6/00
(52) U.S. Cl. .................................................... 385/135
(58) Field of Search ............................... 385/135–137

(56) References Cited

U.S. PATENT DOCUMENTS

| | | | |
|---|---|---|---|
| 4,026,415 A | 5/1977 | Sarley | 211/4 |
| 4,509,648 A | 4/1985 | Govang | 211/70.6 |
| 4,901,202 A | 2/1990 | Leschinger | 361/390 |
| 5,243,494 A | 9/1993 | Cotner | 361/728 |
| 5,408,545 A | 4/1995 | Lee | 385/11 |
| 5,468,063 A | 11/1995 | Simonek | 312/334.28 |
| 5,729,370 A | 3/1998 | Bernstein | 359/118 |
| 5,781,410 A | 7/1998 | Keown | 361/690 |
| 5,911,019 A * | 6/1999 | Cohen | 385/24 |
| 5,987,203 A * | 11/1999 | Abel et al. | 385/51 |
| 6,014,490 A * | 1/2000 | Canning et al. | 385/135 |
| 6,025,557 A | 2/2000 | Daud | 174/65 G |
| 6,146,149 A * | 11/2000 | Daoud | 439/49 |
| 6,157,714 A | 12/2000 | Daud | 379/413.02 |
| 6,278,829 B1 * | 8/2001 | BuAbbud et al. | 385/135 |
| 6,295,343 B1 | 9/2001 | Hjartarson | 379/93.05 |
| 6,314,102 B1 | 11/2001 | Czerwiec | 370/395 |

OTHER PUBLICATIONS

CNX-5 Brochure, Catena Networks, 2001 (6 pages).

Catena Networks White Paper "Pushing Out The Boundaries Delivering DSL Beyond the Central Office", Catena Networks, 2001 (8 pages).
U.S. Appl. No. 10/137,131 (23 pages).
Office Action dated Feb. 4, 2003 in U.S. Appl. No. 10/137,131 (10 pages).
Summary of Examiner Interview on Apr. 29, 2003 in U.S. Appl. No. 10/137,131 (1 page).
Response to Office Action dated May 3, 2003 in U.S. Appl. No. 10/137,131 (29 pages).
Office Action dated Jul. 10, 2003 in U.S. Appl. No. 10/137,131 (12 pages).

\* cited by examiner

Primary Examiner—Frank G. Font
Assistant Examiner—Timothy L. Rude
(74) Attorney, Agent, or Firm—Silicon Valley Patent Group LLP

(57) ABSTRACT

An outdoor enclosure for a remote terminal is designed so that a structure supporting protector modules (normally coupled between telephone lines and line cards to prevent damage from a surge in current or voltage) is easily reachable and removable. To upgrade from copper to fiber, the just-described hardware (also called "protect block") is replaced with other hardware (also called "fiber fanout enclosure") that supports adapters for receiving connectors of optical fibers. The protect block and the fiber fanout enclosure are designed to have approximately (or even exactly) the same footprint, so that they occupy at least some of the same space (before and after replacement). Reuse of the same space in this manner is advantageous over an outdoor enclosure designed to have additional space dedicated for adapters and fiber fanout enclosures to be added in future, because a more compact arrangement results from reuse of the same space.

22 Claims, 20 Drawing Sheets

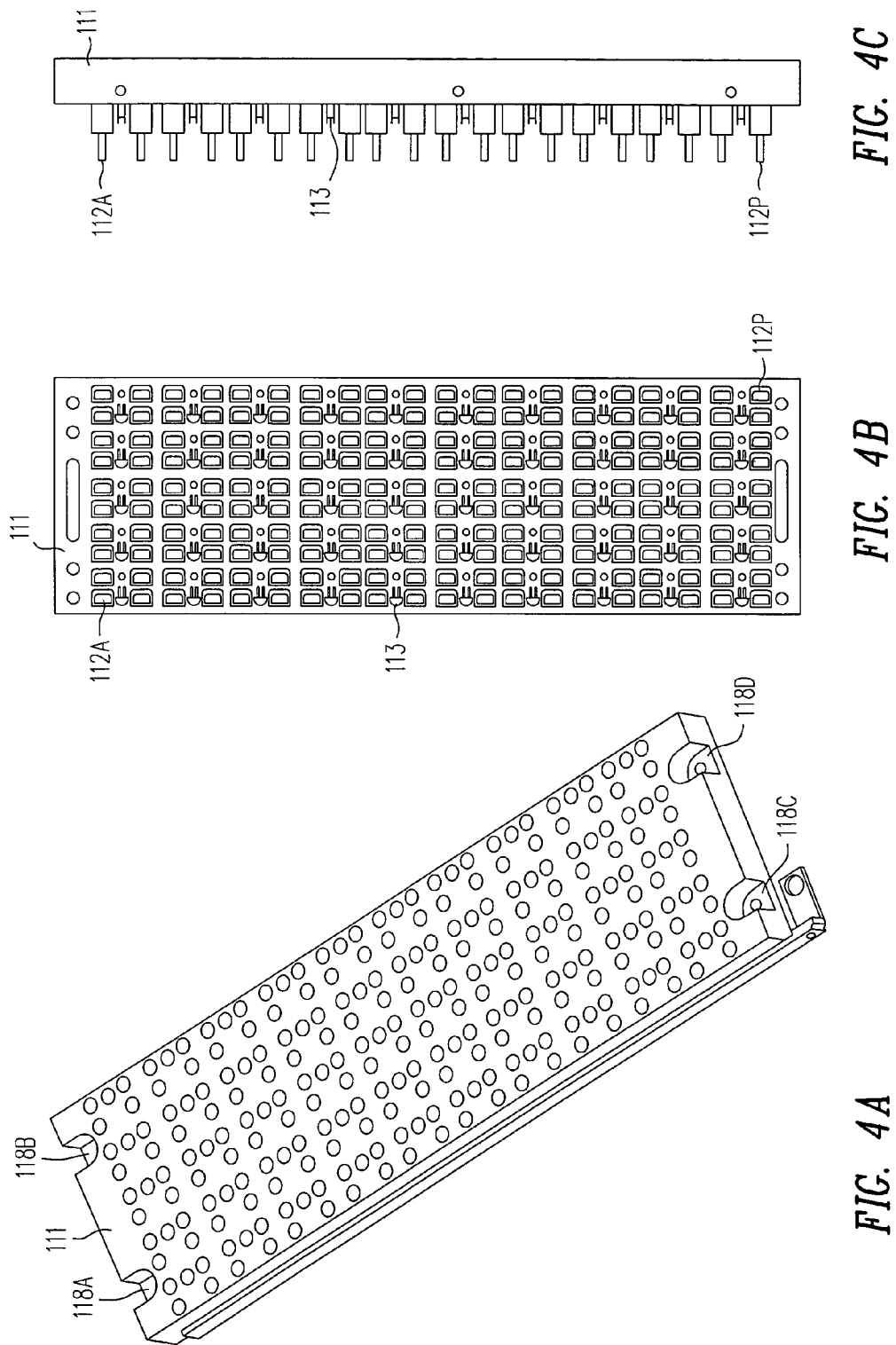

SPACE REUSE DURING TECHNOLOGY UPGRADE IN A PROTECTION AREA OF AN OUTDOOR ENCLOSURE

CROSS-REFERENCE TO RELATED APPLICATIONS

This application is related to and incorporates by reference herein in their entirety the following commonly owned, U.S. patent applications:

Ser. No. 10/081,672, entitled "Beverage Holder Tray On Outdoor Enclosure" by Jane Rodgers filed on Feb. 21, 2002;

Ser. No. 09/814,024, entitled "Heat Exchanger" by Paul D. Swieconek filed on Mar. 21, 2001; and Ser. No. 10/081,469, entitled "Removable Bracket For A Backplane" by Matthew K. Meeker filed on Feb. 21, 2002.

This application is also related to and incorporates by reference herein in its entirety a concurrently filed patent application, U.S. application Ser. No. 10/137,131, entitled "Space Reuse During Technology Upgrade In A Cable Splice Area Of An Outdoor Enclosure" by Paul D. Swieconek.

BACKGROUND

Network elements are commonly used in a telecommunication network to transfer communication signals between various locations (such as cities or suburbs within a city). One or more such network elements may be located physically within a central office of a local telephone company, and are coupled to other central offices via trunks and/or backbone. Each central office is normally connected to telephone instruments of subscribers in nearby locations. For distant neighborhoods (of homes or businesses), the local telephone company installs electronic components outside the central office, at locations called "drop sites." Such electronic components (which may be part of a device called "digital loop carrier" abbreviated as DLC) are typically supported on line cards that in turn are mounted in shelves (also called "card cages") housed within outdoor enclosures (also called "cabinets").

Outdoor enclosures that house DLCs may be mounted on a pole, or mounted on a pad of concrete in the ground. Such outdoor enclosures (also called "cabinets") are normally manufactured of heavy guage mill-galvanized steel with moisture and inset barrier base, overhanging rain guards, closed cell neoprene door gasketing, and screened louvers. For example, Marconi Communications, Inc. has a series of cabinets called MESA. Alcatel also has a line of such enclosures, called LITESPAN, described at, for example, www.usa.alcatel.com. See also, for example, U.S. Pat. No. 5,781,410 granted to Keown et al. and U.S. Pat. No. 4,901,202 granted to Leschinger each of which describes telecommunication cabinets, and each of which is incorporated by reference herein in its entirety.

Local telephone companies now have tens of thousands of such outdoor enclosures in suburban and rural areas. First generation DLCs, such as Lucent's SLC® systems were introduced in the late 1970s. Newer fiber-fed DLCs (also called NGDLCs) were introduced the late 1980s to shorten the copper loops to individual residences. The copper loops supported by DLCs or NGDLCs can be used to provide various services in addition to plain old telephone service (POTS), such as digital subscriber line (DSL). Specifically, voice and data are transmitted simultaneously on a single telephone line, and the central office separates the two types of traffic: low frequency voice traffic is sent to a voice switch while high frequency data traffic is sent to a DSL access multiplexer (abbreviated as DSLAM).

However, cabinets that currently house such DLCs and NGDLCs often lack sufficient space for DSL equipment. Right-of-way issues, aesthetics and high costs (e.g. in pouring new concrete pads or installing additional poles, and obtaining additional electrical power) discourage local telephone companies from installing additional cabinets to support DSL services. In response, telephone equipment vendors have begun to integrate DSLAM functionality into DLC line cards. Integrated line cards may be specifically engineered as card-for-card replacements, such that there is no reduction in POTS (plain old telephone service) capacity. See for example, an integrated line card called "CNX-5" available from Catena Networks. See also U.S. Pat. No. 6,295,343 granted to Hjartarson, et al. that is incorporated by reference herein in its entirety.

Moreover, U.S. Pat. No. 5,729,370 granted to Bernstein and Coy on Mar. 17, 1998 describes a "Method For Upgrading A Communication Network", and is incorporated by reference herein in its entirety. See also U.S. Pat. No. 5,911,019 granted to Cohen, and U.S. Pat. No. 6,314,102 granted to Czerwiec et al each of which is also incorporated by reference herein in its entirety.

SUMMARY OF THE INVENTION

An outdoor enclosure for a remote terminal is designed so that a structure that supports protector modules (normally coupled between telephone lines and line cards to prevent damage from a surge in current or voltage) is easily replaceable. When upgrading from copper to fiber, such a structure (also called "protect block") may be replaced with another structure (called "fiber fanout enclosure") that receives a bundle of fibers (e.g. in a multi-fiber cable), separates the fibers into individual strands, and provides a one-to-one connection between each fiber and a connector. Each such connector may be mounted within an adapter, for coupling the connector to another optical fiber connector.

In one specific embodiment, a protect block is replaced (in a one-for-one manner) with a fiber fanout enclosure that holds adapters for connectors of optical fibers. The protect block and the fiber fanout enclosure are designed to have approximately (or even exactly) the same footprint, so that they occupy at least some of the same space (before and after replacement). Reuse of the same space in this manner is advantageous over a telecommunication enclosure that is designed to have additional space dedicated for adapters and fiber fanout enclosures to be added in future, because of a more compact arrangement resulting from reuse of the same space. Moreover, in some embodiments, there is a one-to-one correspondence between a copper line card and its corresponding protect block, and during migration from copper to fiber, the correspondence is maintained so that identification of line cards to be replaced is easy.

Although described in reference to a remote terminal, an enclosure for any network element (such as an add-drop multiplexer or a cross-connect) may be designed (as described herein) to have an upgrade path for any structures contained therein. Therefore, even after a network element in accordance with this invention is installed and operational in a communication network, a communication hardware (also called "current hardware") that implements a current technology can be removed and replaced (by field service personnel) with another communication hardware (also called "new hardware") that implements a new technology.

During replacement, at least a portion of the space occupied by the current structure is occupied by the new hardware, and in certain embodiments a majority (or almost all or slightly more than all) of the same space is occupied. The hardware to be replaced is initially installed in the network element (during manufacture) in a removable manner, at a position within the network element that is easily accessible to field service personnel. Depending on the embodiment, communication hardware to be replaced may be any hardware normally present in a network element of a data communication network and/or telecommunication network, such as, for example, a telephone line, a line card, or a protector module.

Replacement of hardware in the network element with new hardware in the same space allows for upgrade of the network element in a piece-meal fashion, one hardware at a time, as and when the need arises. Therefore, a network element in accordance with the invention is field upgradeable (also referred to as "retrofittable"). Moreover, the communication hardware may be replaced in a modular manner, e.g. different pieces of hardware that implement the new technology may be purchased individually, even years after an initial purchase of the network element. Only customers who need the new hardware pay for it, and do so on their own time frame. In addition, as new technologies become available in the future, new hardware to support a new technology may be designed to occupy approximately the same space as the to-be-replaced hardware, and technology migration in this manner may be repeated any number of times thereby to provide an upgrade path for future technology.

BRIEF DESCRIPTION OF THE DRAWINGS

FIGS. 4A, 4B and 4C illustrate, in a front perspective view, a rear elevation view, and a side view respectively, a protect block of the prior art, used in the remote terminal of FIG. 1.

FIGS. 6I and 6J illustrate, in an elevation view and a perspective view, a front side of the remote terminal with two card cages accessible when a front door of the outdoor enclosure is opened.

DETAILED DESCRIPTION

Figure 1:
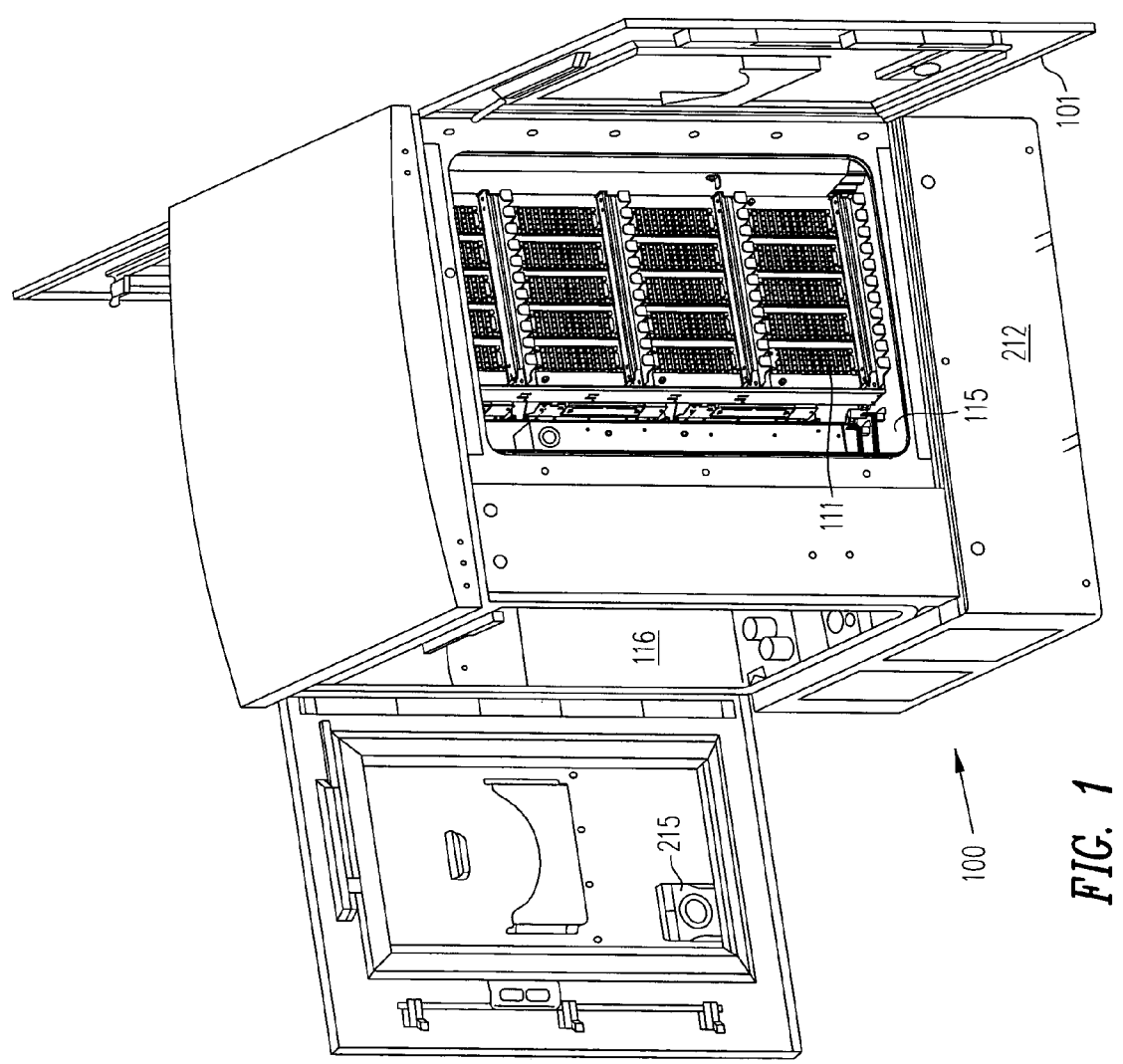
FIG. 1 illustrates, in a perspective view, a remote terminal in an outdoor enclosure in accordance with the invention, having a rear door shown opened to permit access to protection blocks mounted removably therein.
Figure 2C:
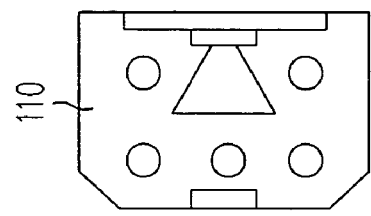
FIGS. 2A–2C illustrate, in a left end view, an elevation view and a right end view respectively, a 5-pin protector module of the prior art, used in the remote terminal of FIG. 1.
Figure 2B:
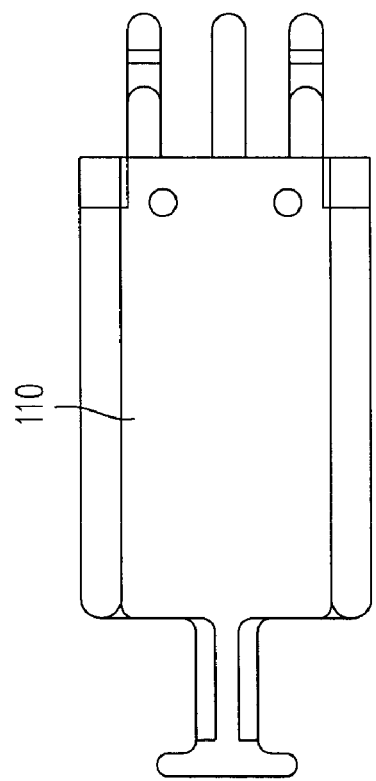
Figure 2A:
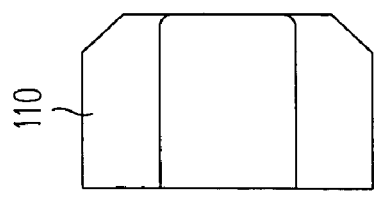

An outdoor enclosure 100 (FIG. 1) for a remote terminal is designed in accordance with the invention so that a block 111 (FIG. 1) supporting one or more protector modules 110 (FIG. 2) normally coupled between telephone lines and line cards (to prevent damage from a sudden fluctuation in current or voltage) is easily reachable and removable. For example, block 111 (called "protect block"), in enclosure 100 may be accessed simply by opening a door (also called "rear door") 101 of a compartment (also called "protection compartment") 115 located in the rear of outdoor enclosure 100.

In one example, protect block 111 is two line cards wide, and supports up to 48 telephone lines (with 24 telephone lines going into each line card). Protect block 111 can be, for example, part number P67304, P66894 or P67417 available from Marconi (Reltec). The protector modules can be any vendor's standard UL approved 5 pin protectors, for example, Joslyn Hi-Voltage Corporation (216) 271-6600's part numbers 2401-11, 2401-21, 2402-01, Cook Electric Company's part numbers 3A, 4A, 7X, 8X, 9X, Reliable Electric Company's part numbers 3A2B, R4A5C, 6U2VS, 6U32VS, 6U132VS, G4AVS, G43AVS, 3GUVS, Western Electric (AT&T, Lucent Technologies)'s part numbers 3C1, 4C1, 3B1A, 3B2A, 3B3A, 3B4A, 4B1C, 4B2C, 4B3C, 4B4C, 3B1E, 3B2E, 3B3E, 3B4E. Such protector modules are also described in U.S. Pat. No. 6,178,080 that is incorporated by reference herein in its entirety.

Figure 3:
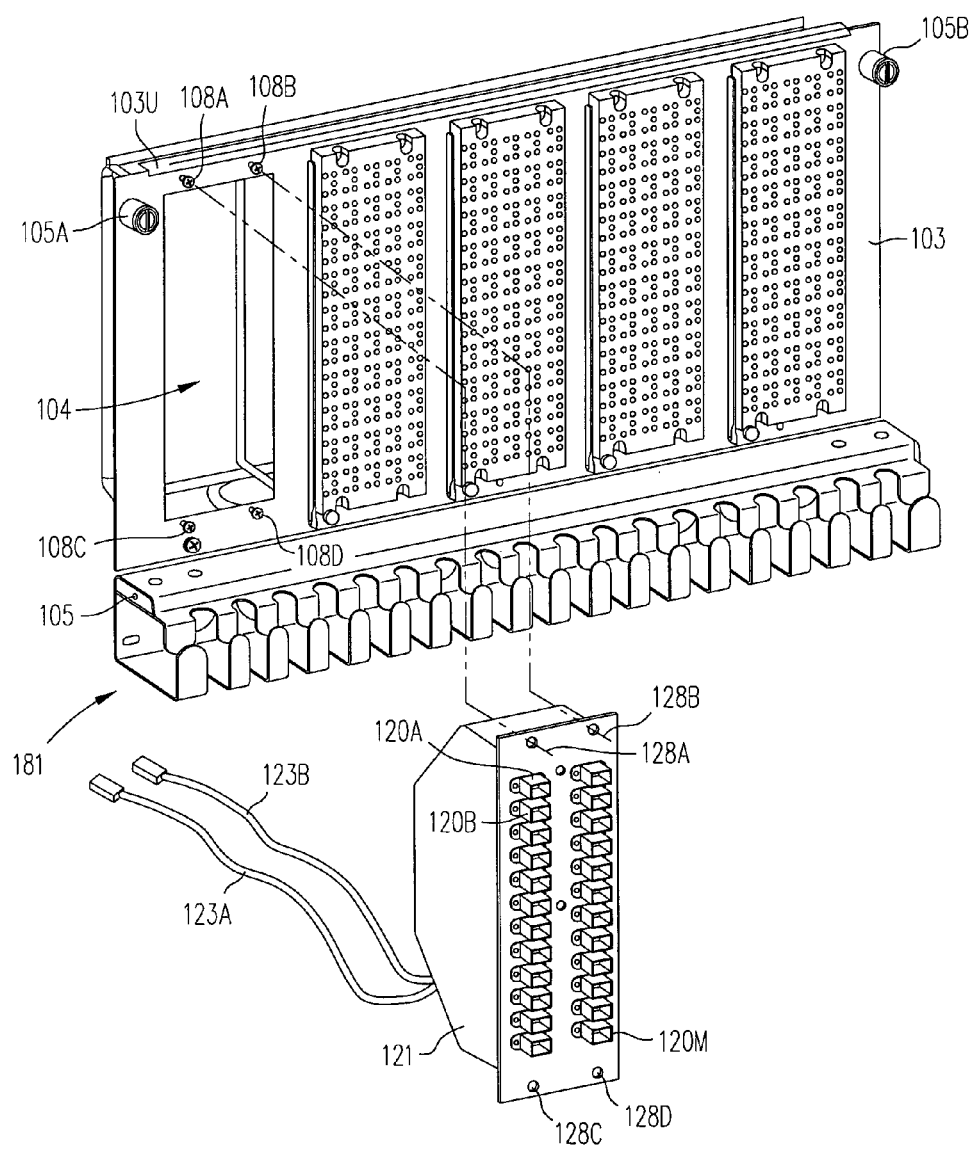
FIG. 3 illustrates, in a perspective view, a frame that supports a number of protect blocks, and a fiber fanout enclosure to be inserted into a hole in the frame in place of a protect block that has been removed.

To upgrade from copper to fiber, a protect block 111 in outdoor enclosure 100 (FIG. 1) is replaced (in a one-for-one manner) by a fiber fanout enclosure 121 (FIG. 3) that supports a number of individual adapters 120 which contain connectors of a number of individual strands of optical fibers that spread out like a fan from a multi-fiber cable (or an equivalent bundle of fibers). Adapters 120 are individually labeled as 120A–120M, wherein A≦I≦M, M being the total number of adapters, e.g. 24 adapters. Specifically, a frame (also called "panel") 103 has a number of holes, such as hole 104 in which protect block 111 was originally supported, and the same hole 104 now accommodates a body of fiber fanout enclosure 121.

Protect block 111 (FIGS. 4A–4C) of the prior art is selected (from among a number of such blocks in the prior art) to support upgradability of outdoor enclosure 100. In FIG. 4A, protect block 111 is shown with the socket side in view (wherein a number of 5-pin protector modules are received), and block 111 has wire-wrap pins 112A–112P as illustrated in FIG. 4C. Only four of the five protector module pins have equivalents among pins 112A–112P, and a middle pin of the protector module has a forked feature 113 that provides connection to a source of the ground reference voltage. Pins 112A–112P are connected by wire wrapping (a method of attaching a bare copper wire to a metallic post) to the send and receive wires in each of the twisted pairs that need to be connected to one another.

Figure 5G:
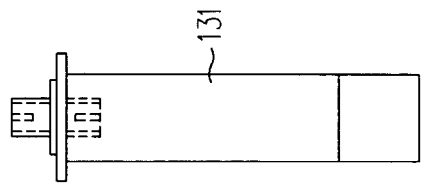
FIGS. 5E–5G illustrate, in a plan view, a side view and an elevation view respectively, an alternative embodiment of a fiber fanout enclosure, for use in, for example, a central office location of a remote terminal.
Figure 5E:
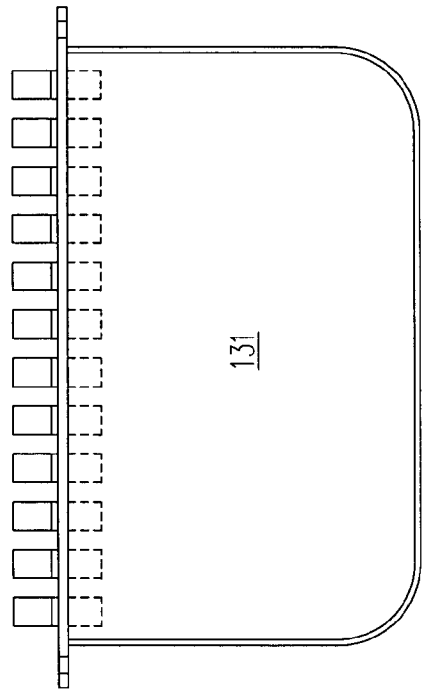
Figure 5F:
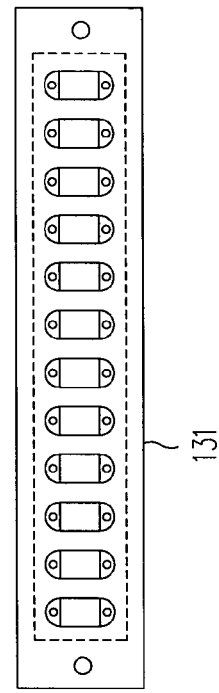
Figure 5A:
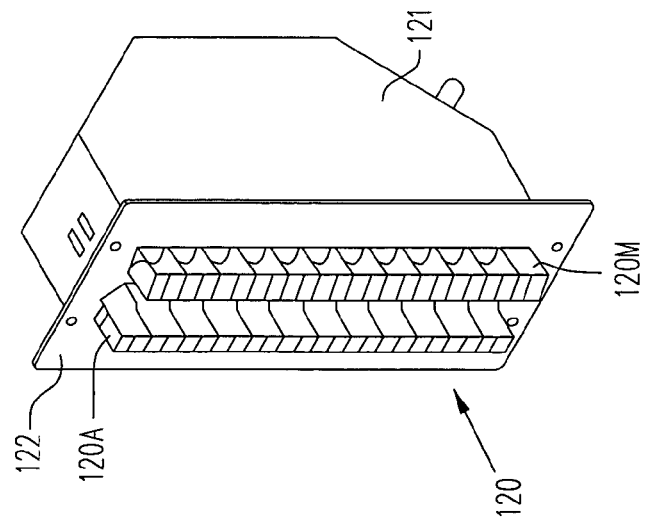
FIGS. 5A, 5B, 5C and 5D illustrate, in a front perspective view, a front elevation view, a side view and a bottom plan view respectively, a fiber fanout enclosure designed in accordance with the invention, to replace protect blocks in the remote terminal outdoor enclosure of FIG. 1.
Figures 5B, 5C, 5D:
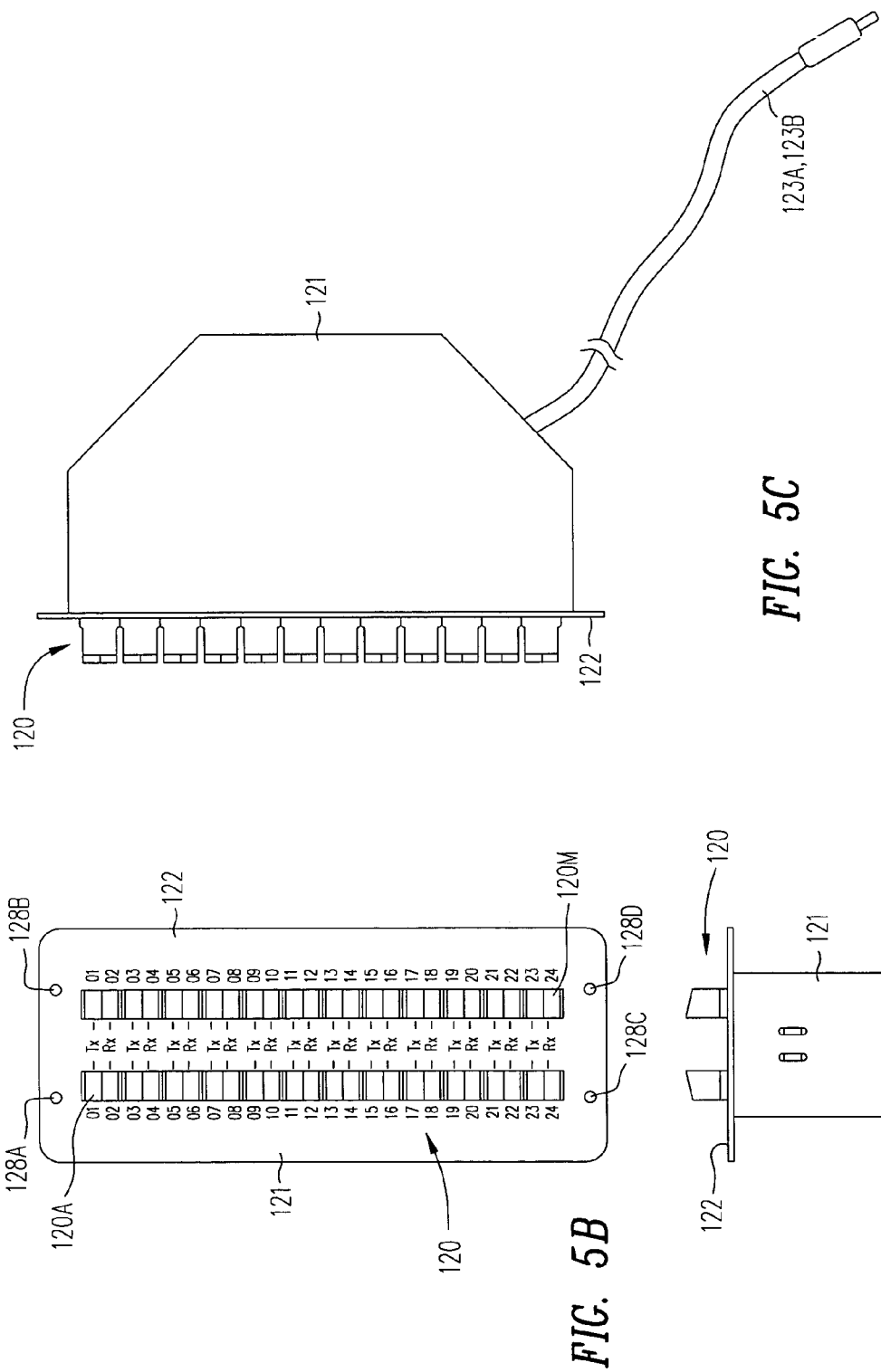

Fiber fanout enclosure 121 has a number of adapters 120A–120M (collectively labeled as 120) with doors that are pivotable toward a center line C, and provide laser shielding protection. In the implementation illustrated in FIGS. 5A–5D, there are a total of 24 LC duplex adapters that are attached rigidly to a face plate 122, with each adapter having two doors, one for transmit and one for receipt. In this implementation, entry of multi-fiber cables 123A and 123B into enclosure 121 is from the bottom of enclosure 121, as illustrated in FIGS. 5C and 5D. Note that instead of a cable (or bundle) entering enclosure 121 at the bottom, in an alternative embodiment, a high-density fiber connector (such as a BMTP connector or a MPX connector) is provided (not shown). In such an embodiment, cables 123A and 123B have their own high-density connectors that plug into the respective high-density connectors in enclosure 121. Although such an embodiment is more expensive and has greater signal loss, it may be used in applications requiring, for example, greater flexibility.

Cables 123A and 123B, can be of any length depending on the space required in view of the design of outdoor enclosure 100. In one implementation, the cable length is sufficient to accommodate pivoting of frame 103, for example, 30 inches long. Depending on the implementation and the need, each of cables 123A and 123B (also called "pigtails") may respectively terminate in a single multi-fiber connector (also called "high-density connector") 124A or 124B that plugs into optical connector 143A or 143B (FIGS. 6F and 6G; discussed elsewhere herein). Examples of a high-density connector include a 24 fiber BMTP connector from Molex or MPX connector from AMP having for example, twin flat ribbons with oval jacket.

Even after installation and operation in a network, connectors 124A and 124B may be upgraded (or downgraded if necessary) in the following manner: fiber fanout enclosure 121 to which cables 123A and 123B (and therefore connectors 124A and 124B) are integrally connected is replaced in the field with a similar enclosure (not shown) that has the new connectors. At the same time, the corresponding connectors 143A and 143B are also replaced, e.g. as described in U.S. patent application Ser. No. 10/081,469 entitled "Removable Bracket For A Backplane" that has been incorporated by reference above. In this manner, replacement of connectors (both plugs and sockets) supports technology upgrade in protection compartment 115. An example of such an technology change may be between a BMTP connector available from Molex and MPX connector available from AMP.

At its end facing door 101 (when shut), fiber fanout enclosure 121 (FIG. 6E) can have any type of connector (also called low-density connector) for a single fiber, such as SC or LC. Depending on the number of fibers in each of cables 123A and 123B, there are a corresponding number of connectors (and adapters) mounted on face plate 122 (FIG. 5B), e.g. 24 connectors or 48 connectors. Adapters 120 (in which such connectors are located) may also be upgraded, simply by replacing the fiber fanout enclosure 121 with an appropriate equivalent. As an example, a service provider may upgrade a fiber fanout enclosure having SC connectors with another fiber fanout enclosure having LC connectors.

Although a specific enclosure 121 is illustrated in FIGS. 5A–5D, any commercially available enclosure may be used, e.g. Part No. 055-2330-0000 available from Telect, Inc. depending on whether or not the footprint thereof is smaller than or same as the footprint of protect block 111 that is to be replaced.

Fiber fanout enclosure 121 (FIGS. 5A–5D) is designed to have approximately (or even exactly) the same footprint as protect block 111, so that these two items occupy at least some of the same area (before and after replacement) on frame 103. In the embodiment illustrated in FIG. 3, protect block 111 and the fiber fanout enclosure 121 have approximately the same footprint. Both items 111 and 121 have mounting holes in the same relative locations, and the same screws 102A–102D are used in fastening either of them to frame 103.

In one specific example, protect block 111 has width of 2.7 inches, length of 8.37 inches and depth of 1.10 inch. In this example, fiber fanout enclosure 121 has a width of 3.45 inches, length of 8.525 inches, and a depth of 4.1 inches. The hole in frame 103 is large enough to accommodate a body of 2.15 width and 7.52 height on the rear side of fiber fanout enclosure 121, and also a cut-out portion of protect block 111. Although certain examples have been described and illustrated, as would be apparent to the skilled artisan, any protect block may be replaced with any fiber fanout enclosure or a fiber distribution enclosure or a fiber splice tray holder so long as each occupies at least some of the same space before and after replacement. An alternative fiber fanout enclosure 131 (FIGS. 5E–5G) is half as wide as fiber fanout enclosure 121 (FIGS. 5A–5D), and is used, for example, with a protect block that is also half as wide as protect block 111.

An outdoor enclosure 100 (FIG. 1) that reuses space (e.g. space occupied by either the copper protector modules or the fiber optic adapters, and space occupied by either the protection block or the fiber fanout enclosure) is advantageous over a prior art outdoor enclosure having two distinct spaces, one for copper hardware and another for fiber hardware. This is because prior to migration from copper to fiber, the fiber space of such a prior art outdoor enclosure is empty, and subsequent to migration the copper space is empty. In contrast, gradual, one-for-one replacement of copper communication hardware with fiber communication hardware in the same space in accordance with the invention results in a more compact arrangement, because no space is left unused (e.g. starting with all copper hardware based outdoor enclosure, and ending with all fiber hardware based outdoor enclosure).

Figure 6A:
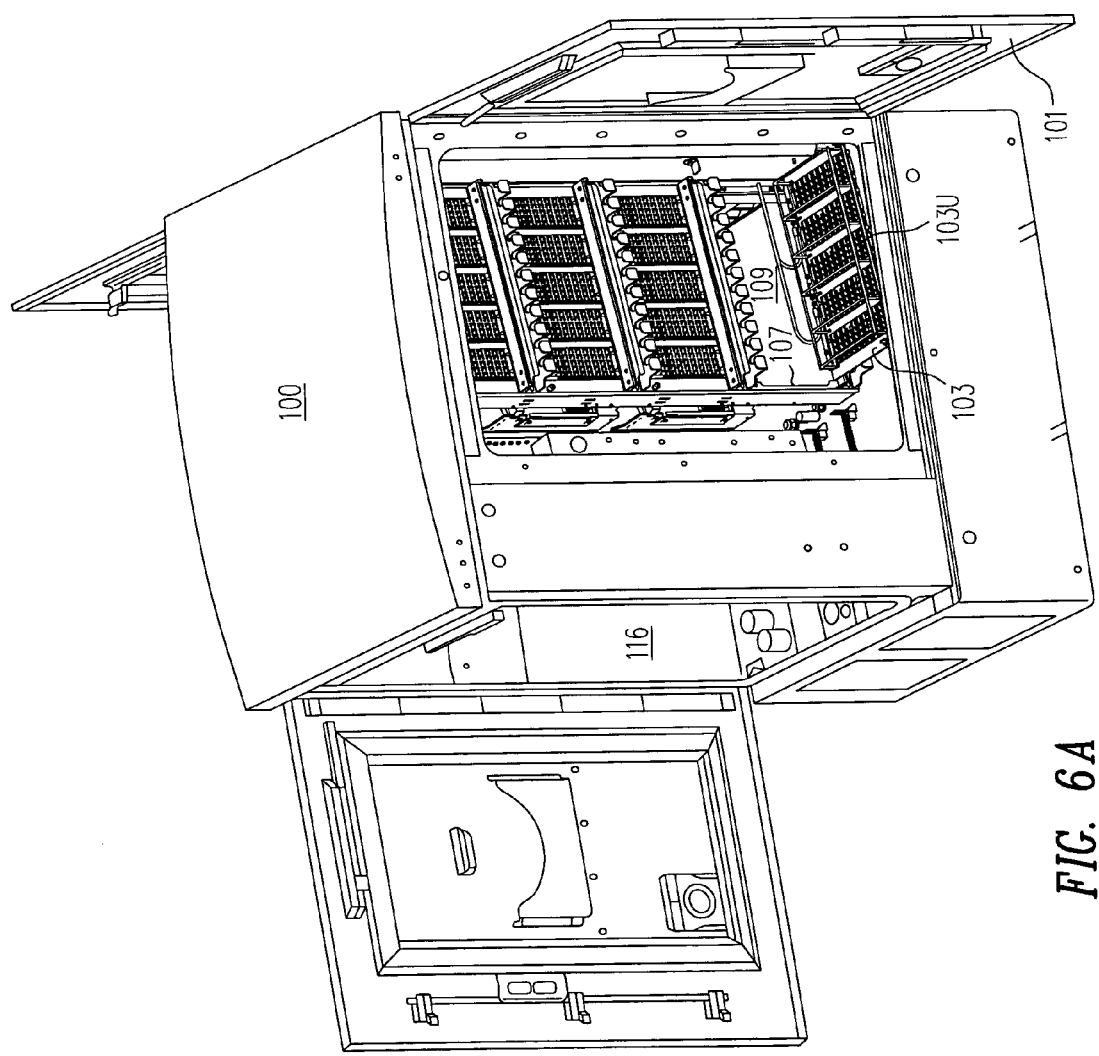
FIGS. 6A–6G illustrate acts performed in replacing a protect block with a fiber fanout enclosure in a remote terminal outdoor enclosure in one embodiment of the invention.
Figure 6B:
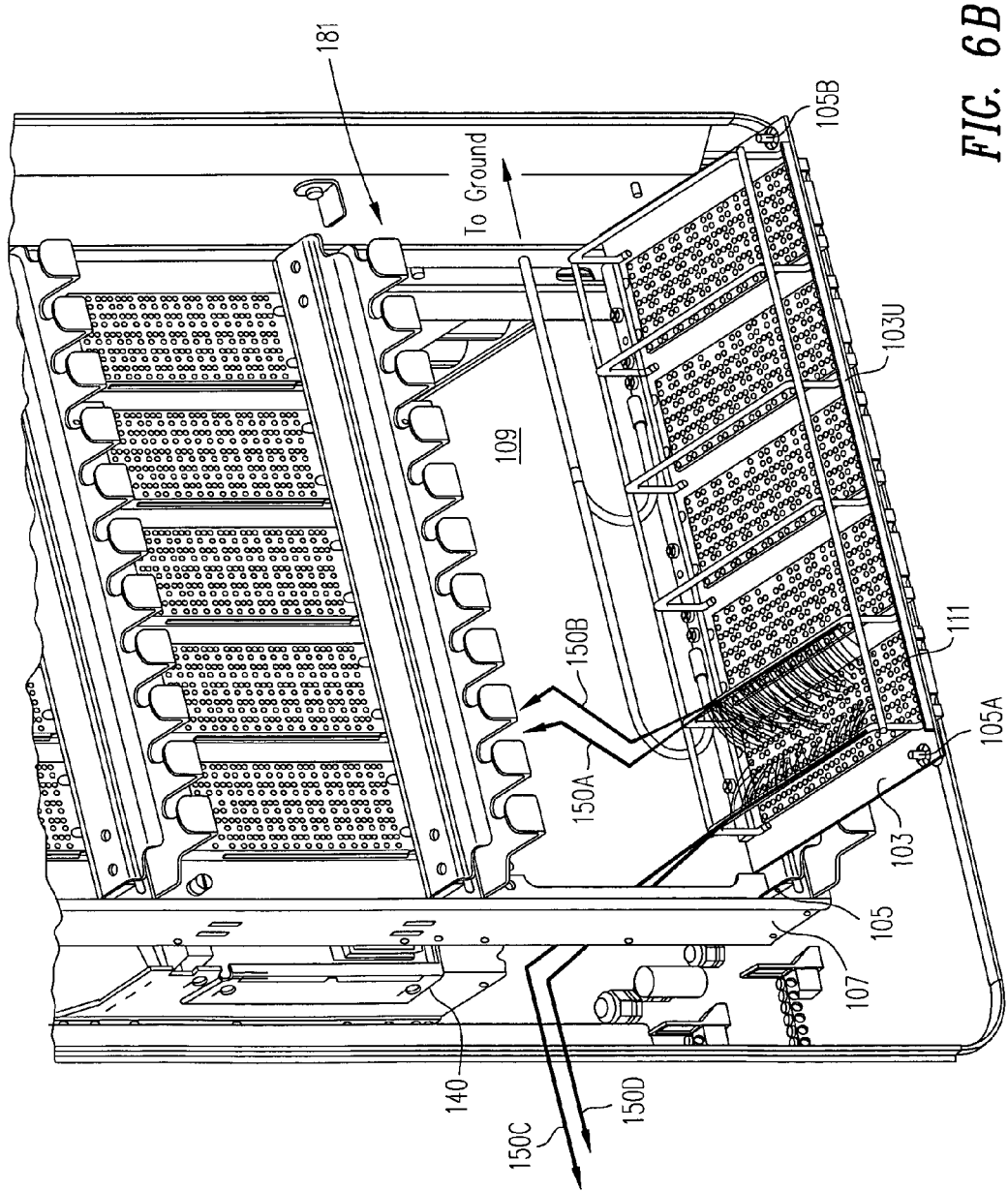
Figure 6C:
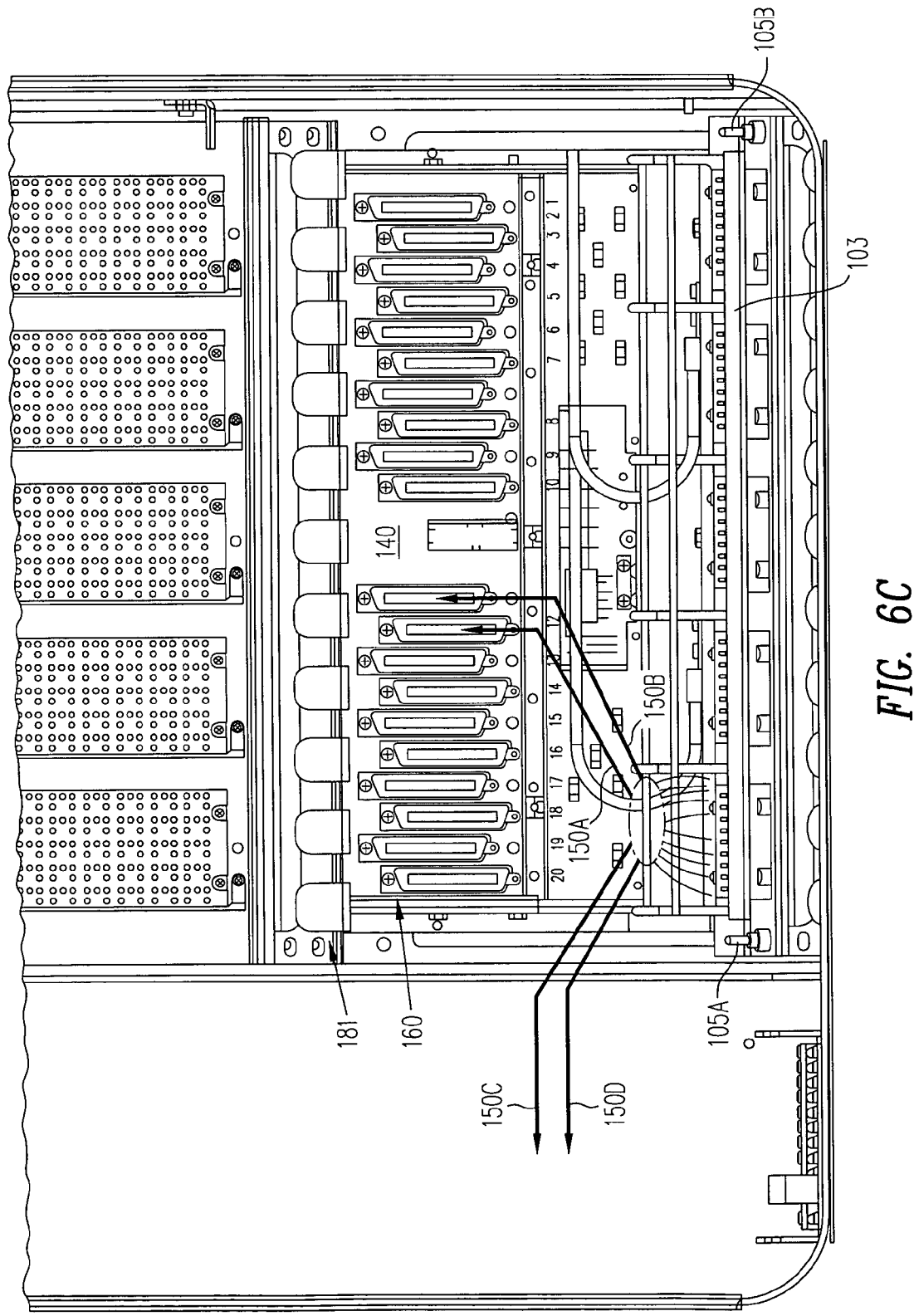

In one embodiment, illustrated in FIG. 6A, frame 103 has a lower edge 103L that is pivotably connected to a rack 107 in outdoor enclosure 100 by a rod and sleeve mechanism 105 (FIG. 6B). An upper edge 103U of frame 103 is secured to rack 104 with screws (also called "captive retaining screws") 105A and 105B. Therefore, during upgrade from copper to fiber, frame 103 can be flipped down, from a vertical position to a horizontal position, thereby to allow the field service person to reach into a region 109 between frame 103 and a card cage (not shown in FIG. 6A). In this region 109 (FIG. 6B) are located a number of copper cables 150, which include cables 150A and 150B that are connected to line cards that are also to be upgraded, and cables 150C and 150D (FIG. 6D) that are connected to subscriber equipment.

All cables 150 that are connected to protect block 111 need to be disconnected during copper to fiber migration. Cables 150A and 150B are easy to disconnect, simply by disconnecting the appropriate connectors 160 behind card cage 140. Cables 150C and 150D that go to a splice compartment are physically cut at protect block 111, so that when protect block 111 is to be removed, it can be freely moved (unconstrained by cables 150C and 150D). In one example, each of cables 150 is a 25 pair cable (i.e. 25 twisted pairs, or 25 telephone lines).

Figure 6D:
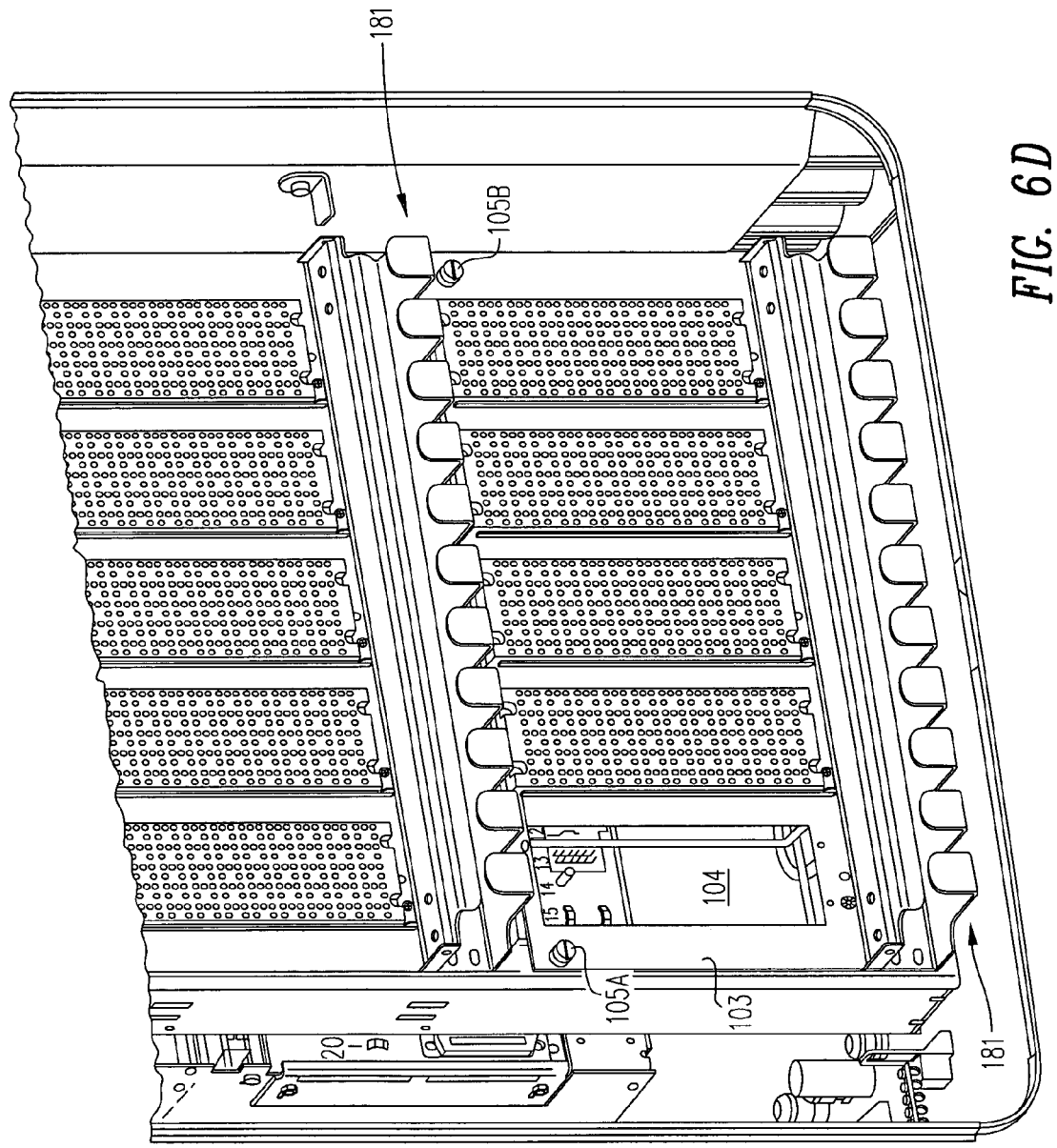

Next, frame 103 is swung back to vertical position and secured to frame 103 by captive retaining screws 105A and 105B. Thereafter, screws 108A–108D (FIG. 3) that secure block 111 (via holes 118A–118D shown in FIG. 4A) via frame 103 are removed, thereby to separate block 111 from frame 103. Block 111 is thereafter pulled away from frame 103 thereby opening up hole 104 (FIG. 6D). At this time, any cabling attached to block 111 (e.g. cables 150A and 150B) is moved through hole 104 in frame 103, and is also discarded along with block 111.

Figure 6E:
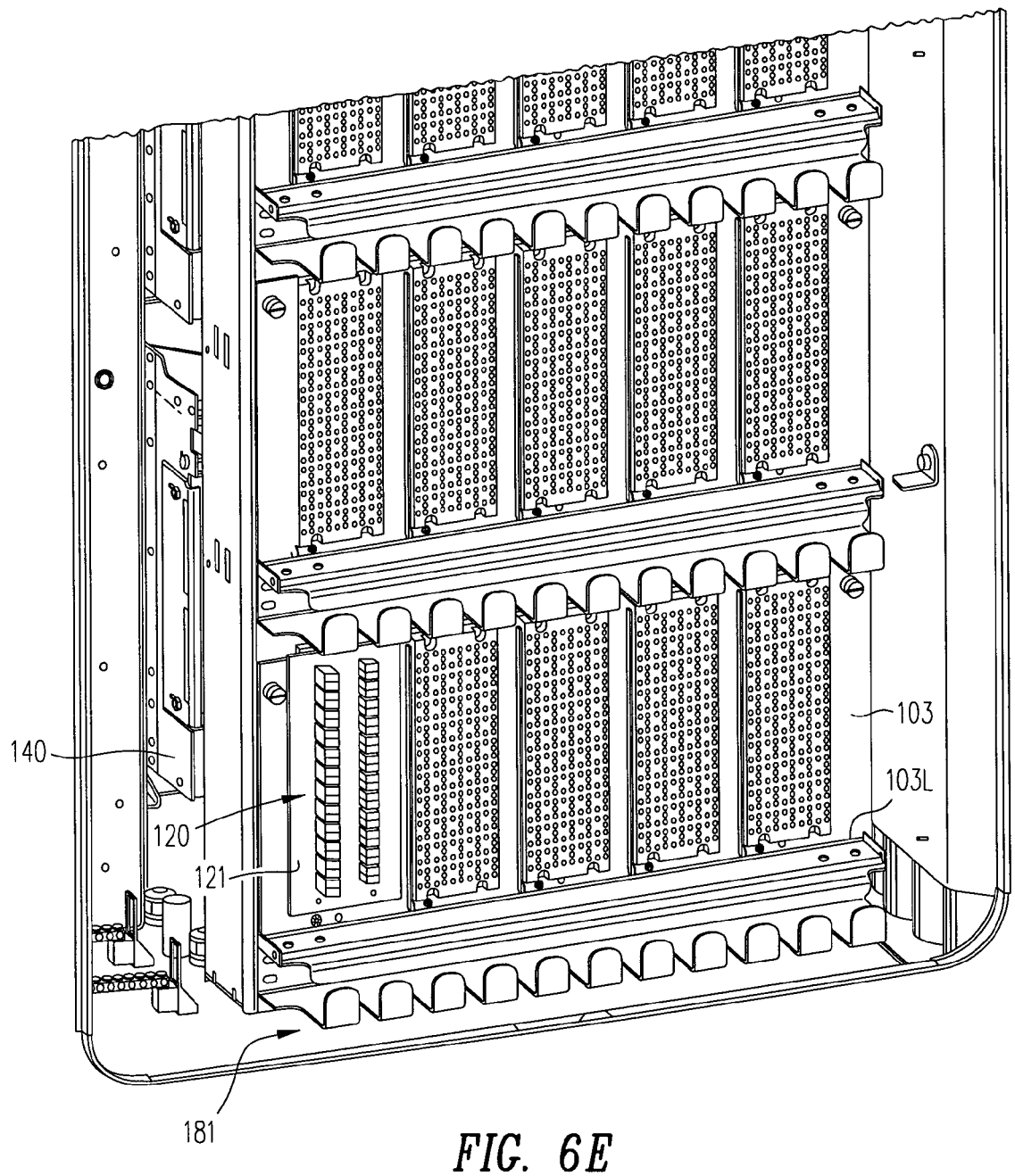
Figure 6F:
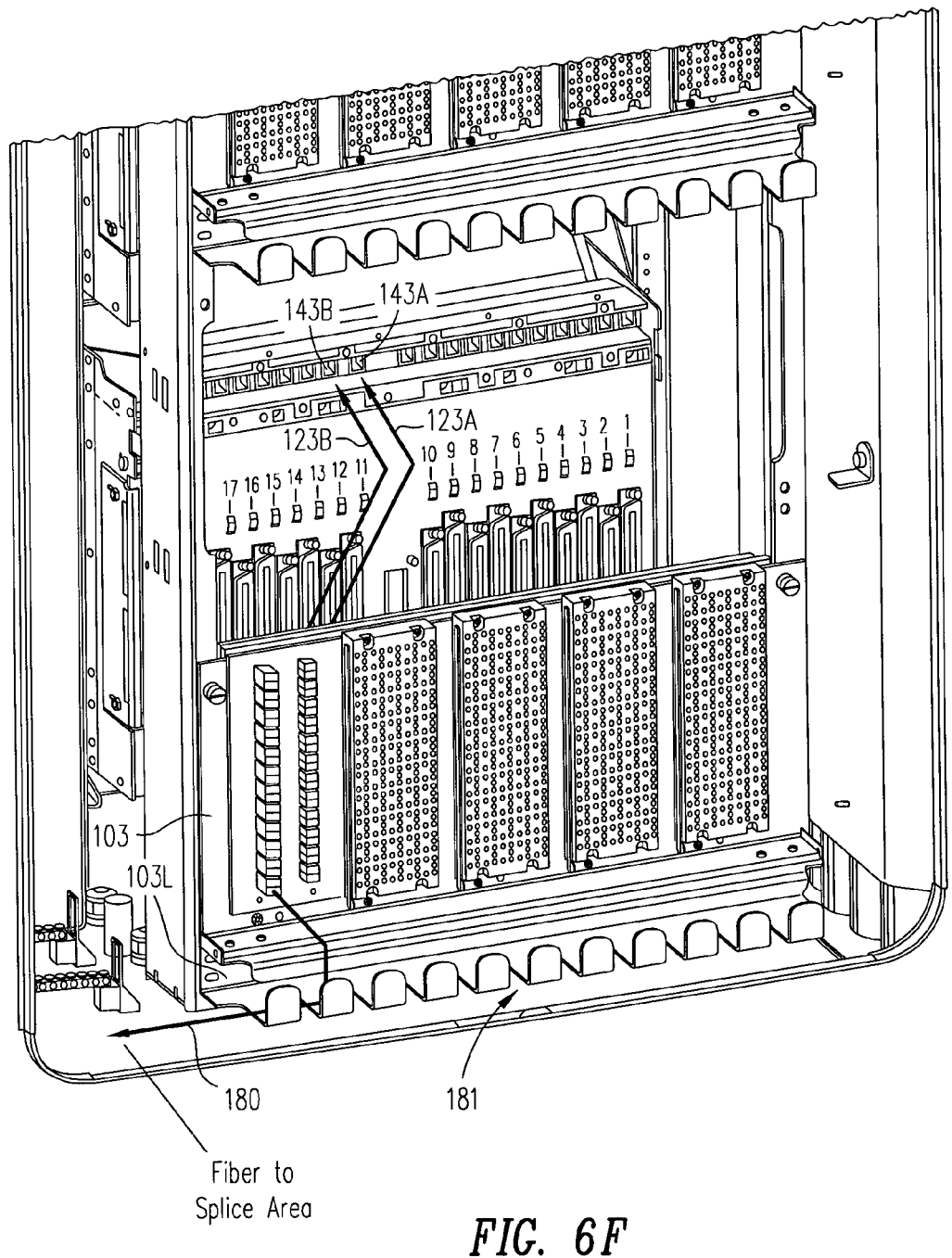
Figure 6G:
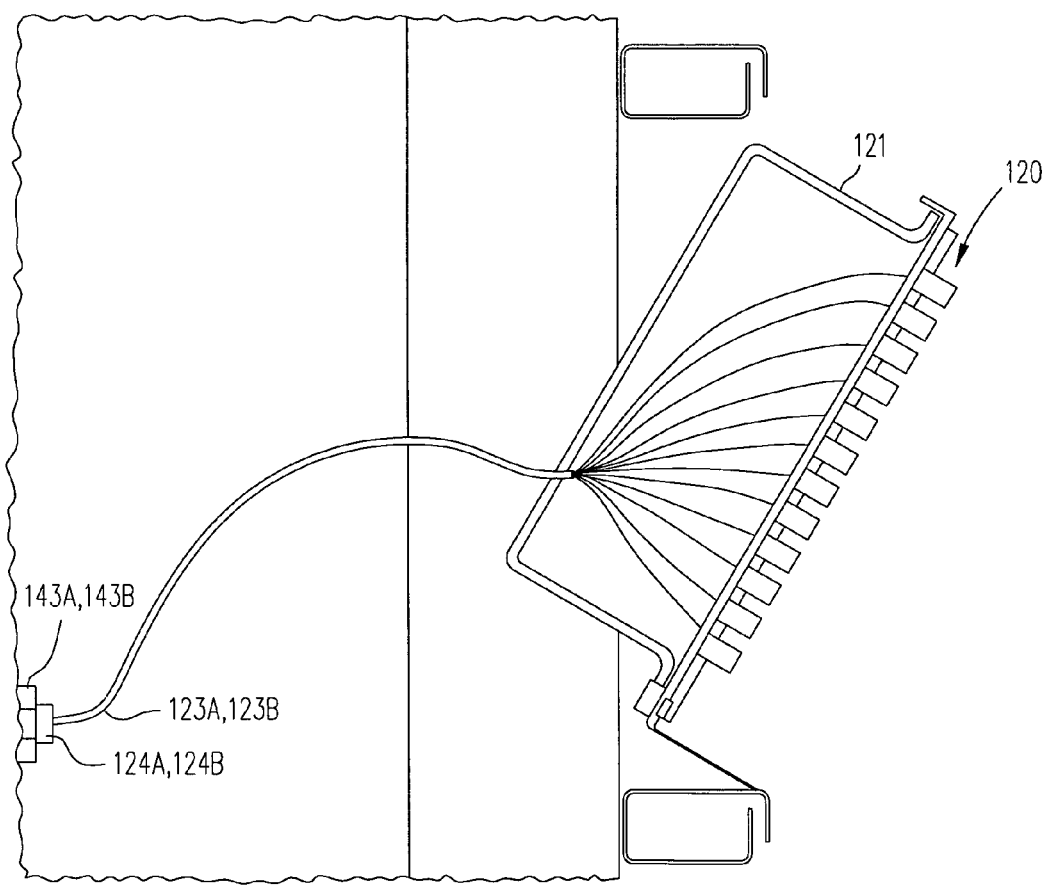

Thereafter, fiber fanout enclosure 121 is mounted on frame 103, in the same location as block 111. In one implementation, the same screws 108A–108D that were used to secure block 111 to frame 103 are now used to secure enclosure 121 to frame 103, because holes 128A–128D (FIG. 3) in enclosure 121 are formed at precisely the same location as the corresponding holes 118A–118D (FIG. 4A). Note that in other embodiments, such holes may be formed at different locations. At this stage, the equipment inside of outdoor enclosure 100 appears as shown in FIG. 6E.

Emanating from the back of fiber fanout enclosure 121 are two multi-fiber cables 123A and 123B (FIG. 3) that are located in region 109 (between frame 103 and card cage 140; see FIG. 6B). Cables 123A and 123B need to be connected to two optical line cards housed within card cage 140. For this reason, frame 103 may be swung down again (FIG. 6G), so that a field service person can reach into region 109 and use their hand to plug the connectors at the end of cables 123A and 123B into optical connectors 143A and 143B (FIG. 6F). In FIG. 6F, a frame physically located above frame 103 is shown removed so that optical connectors 143A and 143B can be seen.

Figure 6H:
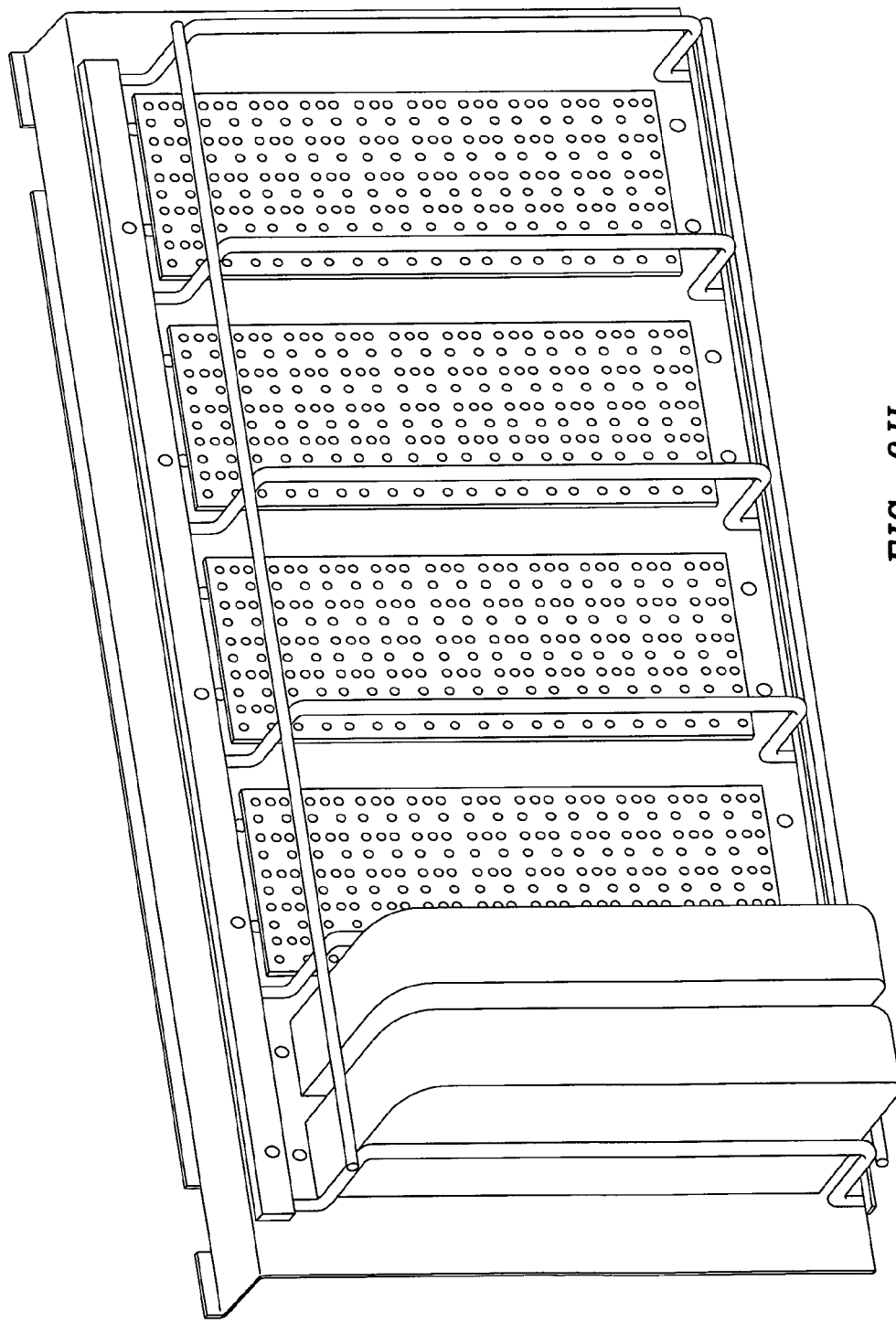
FIG. 6H illustrates, in a front perspective view, an alternative embodiment, wherein the adapters in the fiber fanout enclosure face the back of the chassis, thereby to manage all cables in a space between the card cage and the frame.
Figure 61:
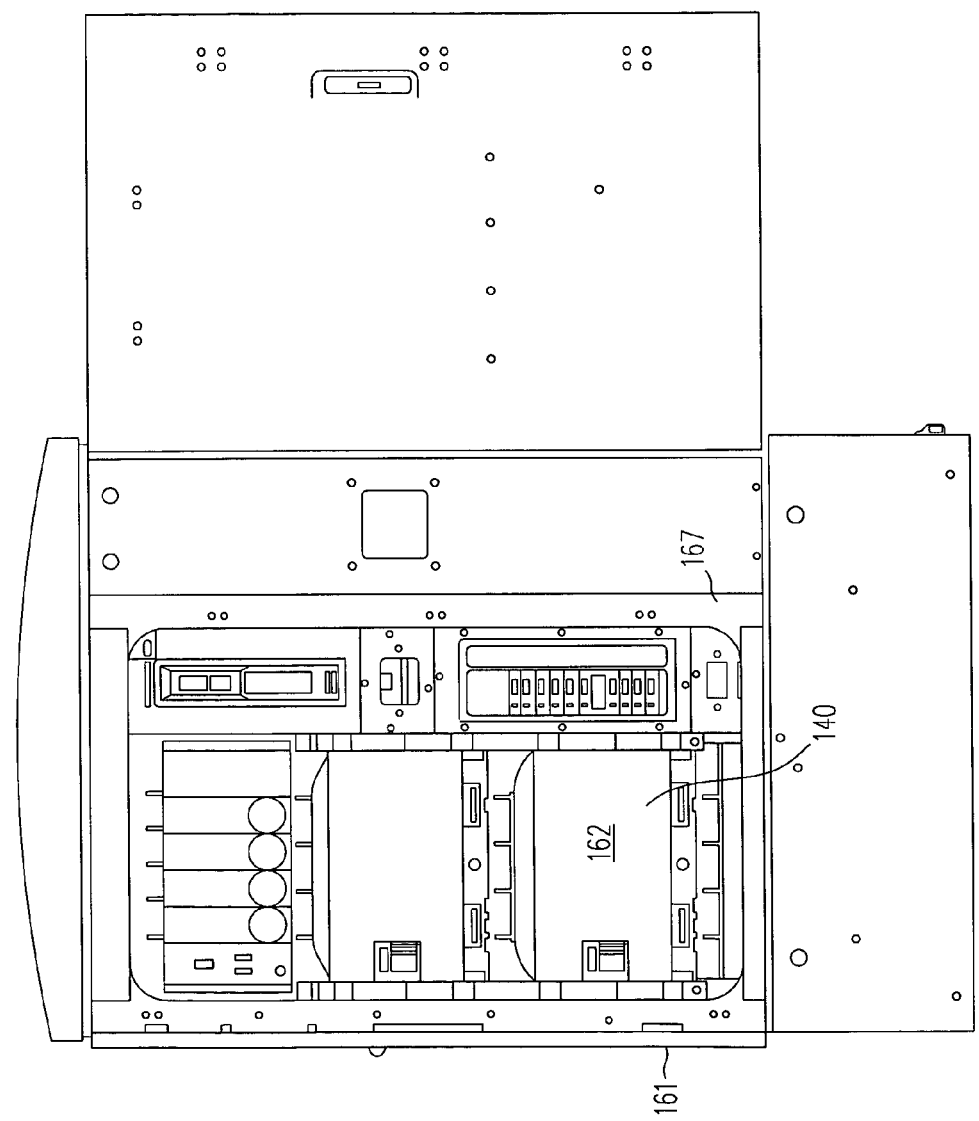

Although in some embodiments, a fiber fanout enclosure 121 has a multi-fiber cable entering on a rear side and adapters located on a front side, all connectivity may be located on the rear side (i.e. the side facing the back of card cage 140, directly facing region 109) in other embodiments, as illustrated in FIG. 6H. Note also that in FIG. 6H, there are two enclosures of the type illustrated in FIGS. 5E–5G, one for each fiber optic card.

Figure 6J:
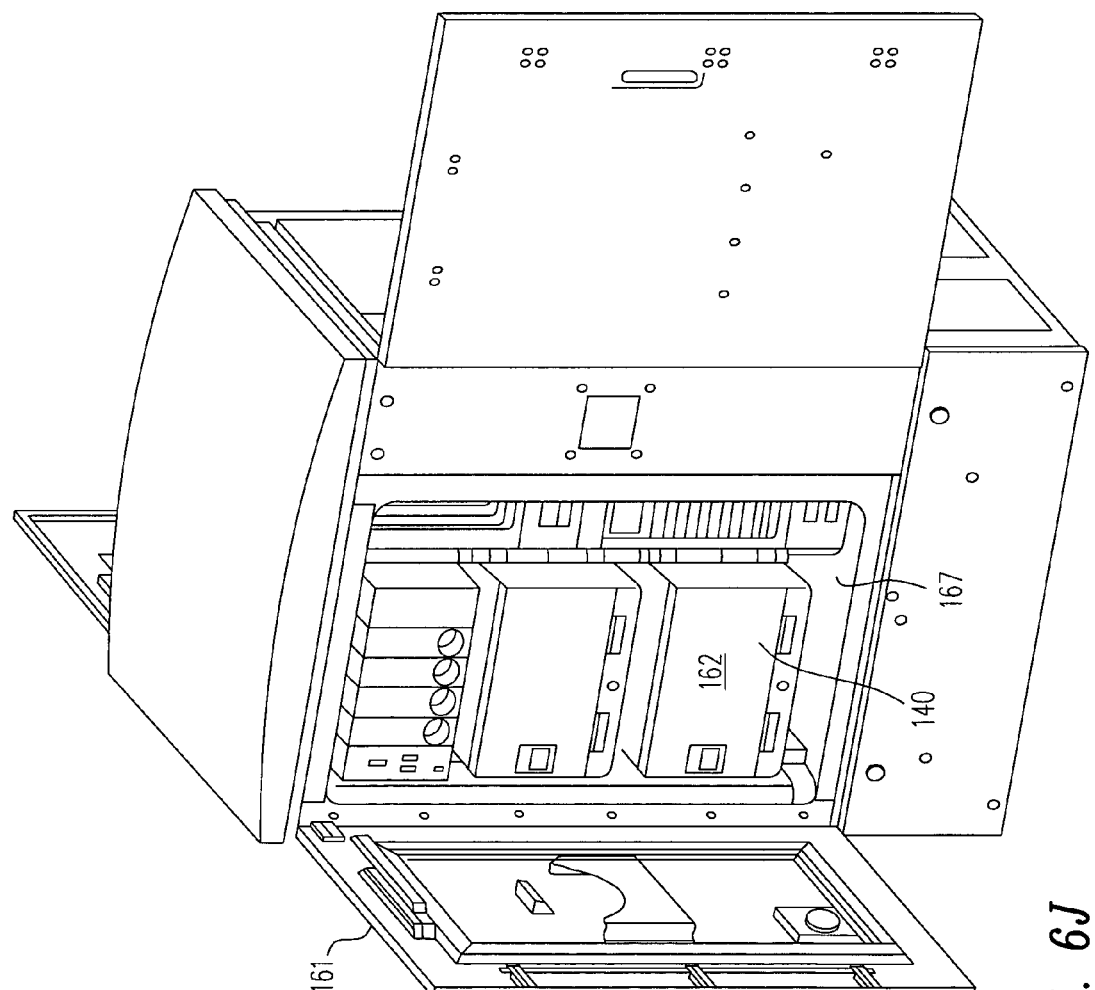

Optical connectors 143A and 143B are serviced by fiber optic cards in the same slots as the connectors from which copper cables 150A and 150B were removed. At this stage card cage 140 may still have copper line cards in these two slots, and the copper line cards need to be replaced by fiber optic cards. To do copper line card replacement, the field service person needs to go to the front of outdoor enclosure 100, open a front door 161 (FIGS. 6I and 6J) of a main compartment 167 and open another door 162 of card cage 140 in which the to-be-replaced copper line cards are located. Thereafter, the line cards are replaced.

Figure 6K:
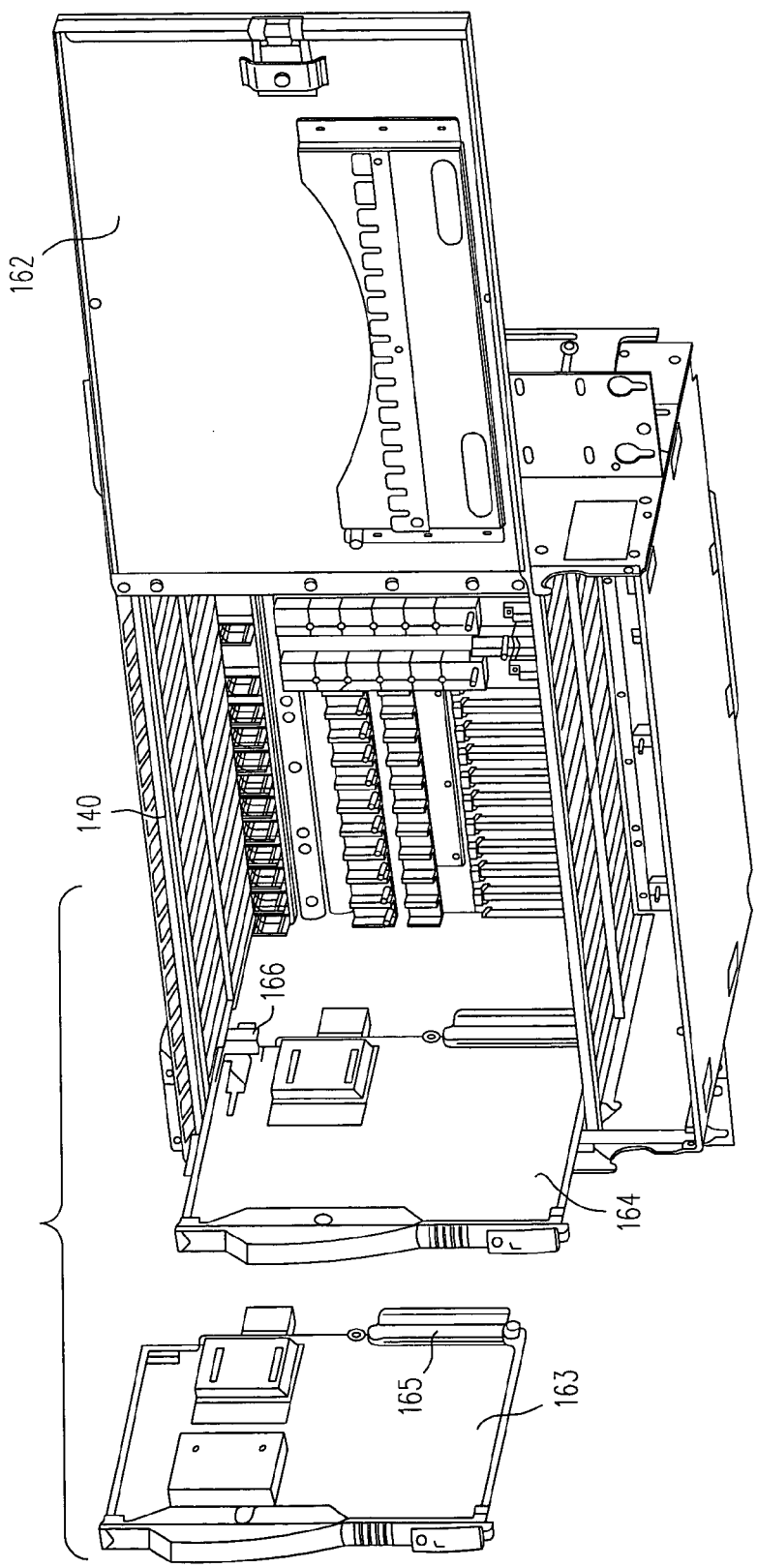
FIG. 6K illustrates, in a perspective view, a card cage with its door opened, and a copper line card being removed and replaced by an optical line card both having the same number of ports, and both kinds of ports located in the back of the card cage.

For example, FIG. 6K illustrates a copper line card 163 that has just been removed, and a fiber optic card 164 is being installed in its place, in the same slot. Copper line card 163 has a backplane connector 165 which is also present on fiber optic card 164. The backplane has a number of copper connectors 160 that are used when a copper line card is present in a slot and are not used when a fiber optic line card is present. For this reason, fiber optic card 164 has its own optical connector 166 that plugs into an adapter in the backplane, for connection to one of fiber cables 123A and 123B. Alternatively, the connectors at the end of cables 123A and 123B may be connected to other fiber optic cards that may be pre-existing in outdoor enclosure 100, or that may be newly inserted into an empty slot in a card cage (not shown) in outdoor enclosure 100.

In one specific embodiment, a fiber optic card supports the same number of optical fibers as the number of copper lines supported by a copper line card that is being replaced. For example, a 24-telephone-line POTS card may be replaced by a 24-fiber optical card. Moreover in this specific embodiment, both types of cards (in addition to having the same number of ports) also have all ports located in the back (relative to the card cage). Such location of ports of both kinds near the backplane (when the cards are installed) supports space reuse during technology migration, in the manner described herein. However, in other embodiments, a fiber optic card may support fewer optical fibers than the telephone lines supported by a POTS card being replaced, and the optical ports may be located in the front.

Figure 7:
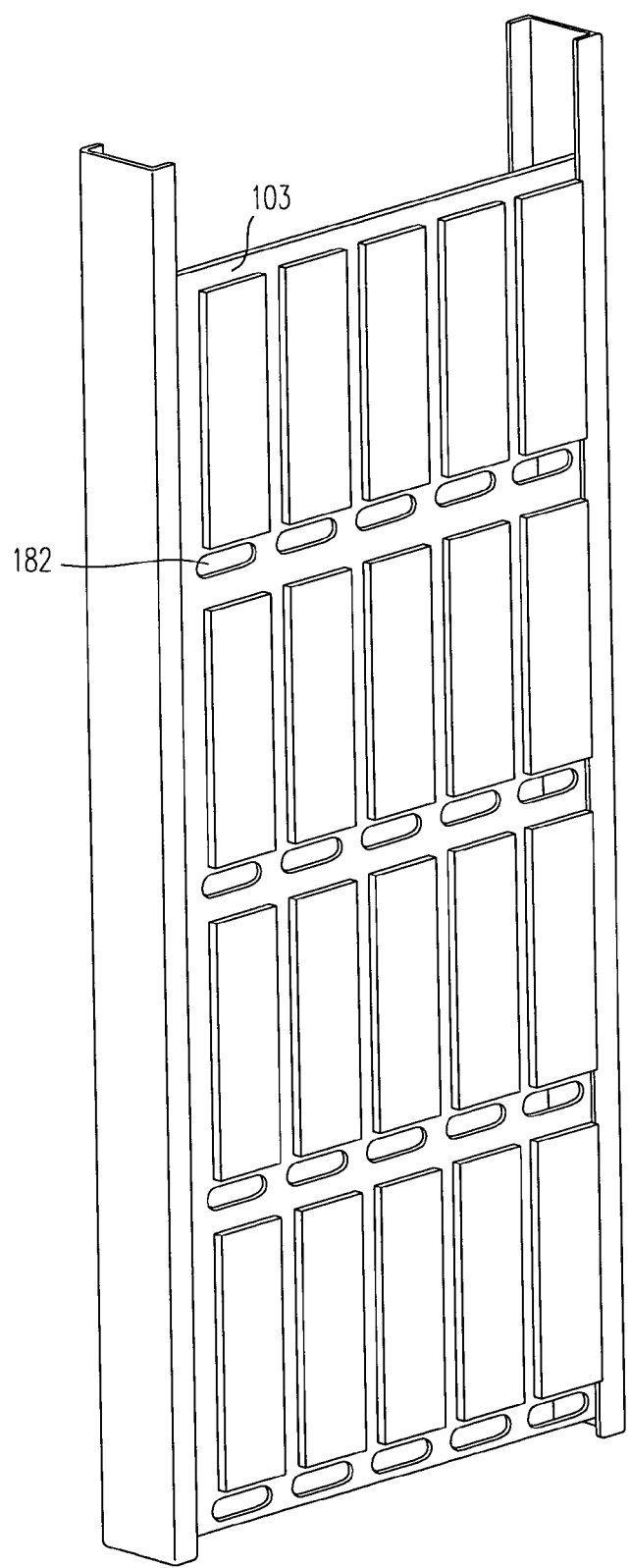
FIG. 7 illustrates, in a front perspective view, an alternative frame for routing fibers from the fiber fanout enclosure to a splice area for coupling to optical fibers that exit the outdoor enclosure.
Figure 8A:
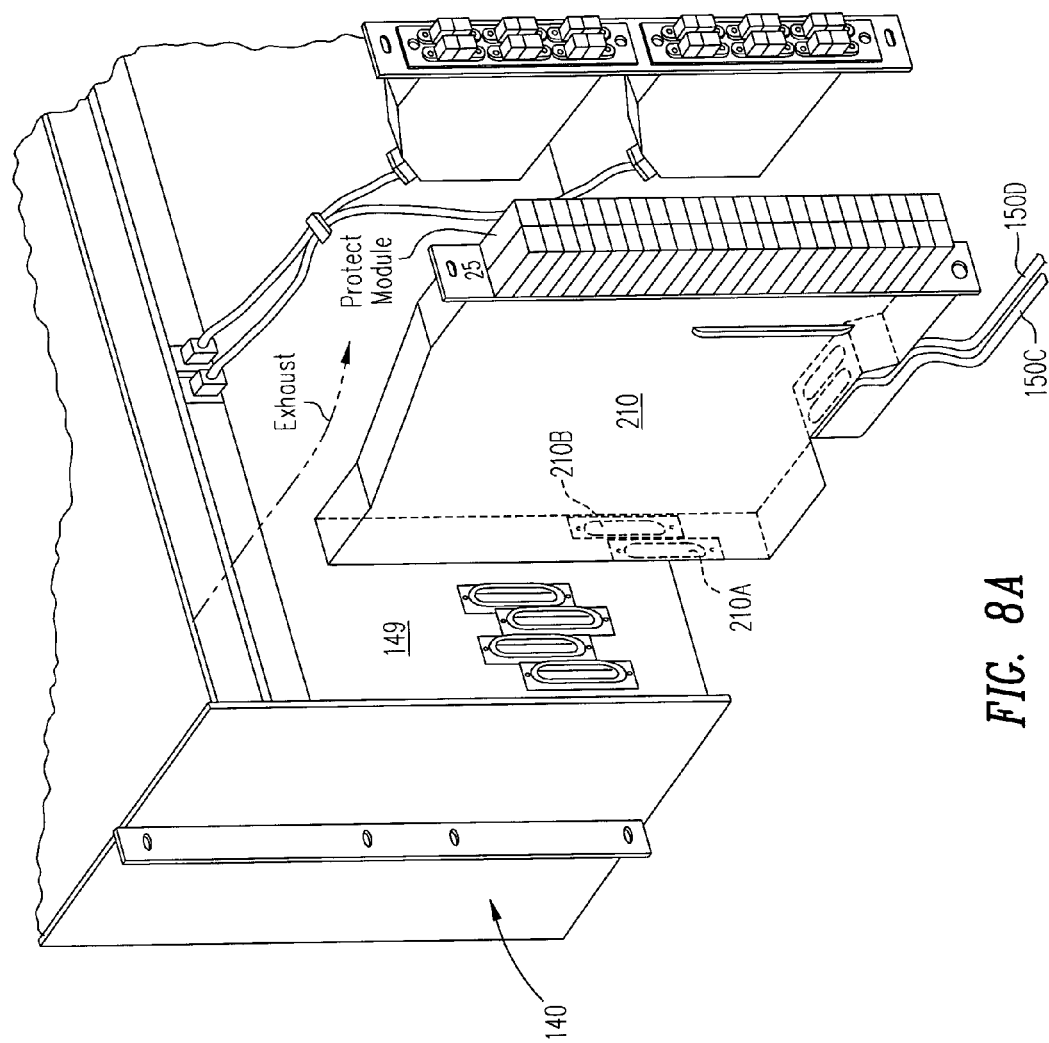
FIGS. 8A, 8B, 8C and 8D illustrate, in a front perspective view, a front elevation view, a side view and a top plan view respectively, an alternative embodiment of an outdoor enclosure with a migration path for replacing protect blocks.
Figure 8C:
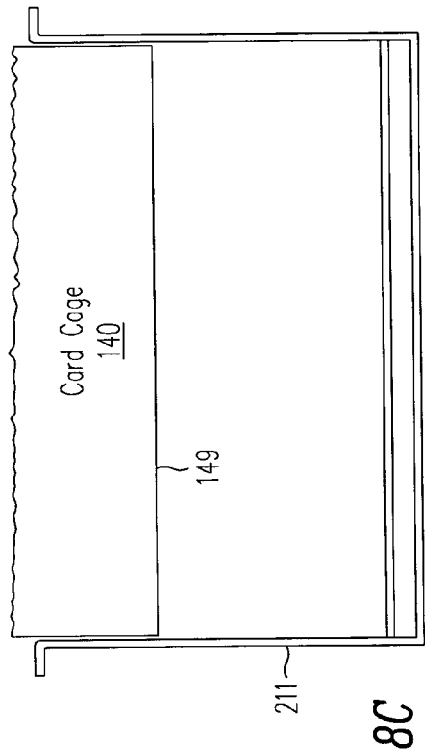
Figure 8D:
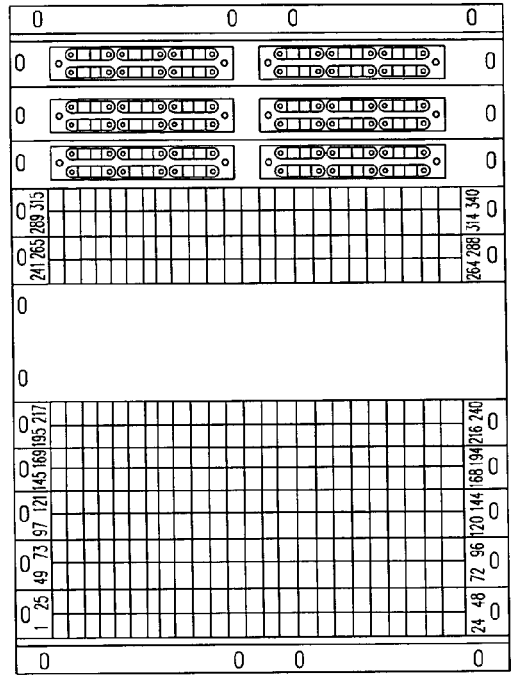
Figure 8B:
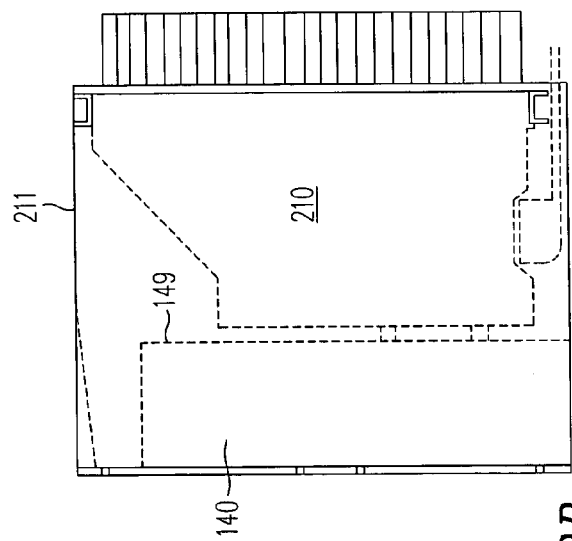

Next, adapters 120 (FIG. 6E) on the newly-mounted fiber fanout enclosure 121 are connected by optical fibers (also called "internal optical fibers") 180 (FIG. 6F) to corresponding optical fibers (also called "external optical fibers") located in a splice compartment that exit the outdoor enclosure, e.g. to connect to subscribers' equipment or to a central office or to another remote terminal. For this reason, fibers 180 are routed to the splice compartment, e.g. via trough 181 (FIG. 6F) located at a lower edge 103L in frame 103. Instead of a trough, holes 182 in frame 103 may be used (FIG. 7) in other embodiments, to manage fibers 180 enroute to the splice compartment.

Depending on the implementation, copper cables that previously connected one or more protector modules to a copper line card may be either left in outdoor enclosure 100, or may be removed. Also depending on the implementation, copper cables that connected the removed protector modules to subscribers may be either left in outdoor enclosure 100, or may be removed.

In certain implementations, an outdoor enclosure 100 of the type described herein has one or more features similar or identical to an outdoor enclosure of the type described in U.S. patent application Ser. No. 10/081,672, entitled "Beverage Holder Tray On Outdoor Enclosure" that has been incorporated by reference above. For example, outdoor enclosure 100 of such an implementation has a compartment 212 (FIG. 1) for housing backup power supply which may be implemented for example by batteries or a generator.

Although compartment 212 is illustrated as being located below protection compartment 115, in other embodiments such compartments may have other spatial locations relative to one another, and may even be formed as separate modules depending on the embodiment. If separated, such modules may be physically arranged adjacent to or in contact with one another, or may be placed at any convenient location, depending on available space.

Moreover, outdoor enclosure 100 of the type described herein may have one or more beverage holder trays (such as tray 215 in FIG. 1) on one or more doors of any compartment. Also, in some implementations, a main compartment 167 has interior paneling and exterior walls that define a heat exchange unit as described in U.S. patent application Ser. No. 09/814,024 entitled "Heat Exchanger" that has been incorporated by reference above.

Numerous modifications and adaptations of the embodiments and implementations described herein will be apparent to the skilled artisan in view of the disclosure.

For example, any communication hardware in a network element that is likely to become obsolete in the future may be designed for easy removal and replacement with new communication hardware while the network element is installed and operational in a communication network. The present invention is therefore not limited to replacement of a protector block with a fiber fanout enclosure, replacement of copper cable with fiber optic cable, and replacement of a copper line card with a fiber optic card (both having the same number of ports and both types of ports located at the back of the card cage). Furthermore, depending on the embodiment, such replacement may be designed to be hot-swappable or alternatively a power down of the entire network element may be required prior to replacement.

In some embodiments, the current technology relates to copper services and the new technology relates to optical fiber based services. However, in other embodiments, the new technology may relate to a cable network or a wireless network. Moreover, new technology may not be available now, but may be expected to be available in the future, in other embodiments. In certain embodiments, the only change being made during an upgrade may be merely a change in specification, and both technologies involved in the upgrade may be, for example copper or fiber. Examples of such a technology upgrade are to implement changes in connector types, e.g. RJ45 to RJ21, or BMTP to MPX.

Furthermore, various permutations and combinations of technology upgrades and/or downgrades may be performed while reusing space, as would be apparent to the skilled artisan in view of the disclosure. For example, a protect block 111 may not be used in some embodiments, and instead the same space may be used (e.g. inside of a central office based network element) for a copper fanout enclosure that may have a pigtail cable that terminates in a high-density AMP CHAMP connector and provides a corresponding number of individual twisted pair connectors such as RJ45 or RJ21. This type of copper fanout enclosure may be replaced during a technology upgrade to fiber, by a fiber fanout enclosure of the type discussed herein.

Moreover, several embodiments of the present invention are not limited in the size or number of structures that are replaced: e.g. all structures may be replaced and/or no structures may be replaced, depending on the need. Furthermore, the specific construction of a structure differs, depending on the embodiment and depending on the implementation.

Also, although described in the embodiment of a network element, any structure in an outdoor enclosure for any electronic equipment may be replaced with a new structure in conformance with a new technology in the manner described herein. For example, an outdoor enclosure for coaxial cables may be designed for a panel of coaxial protectors to be replaced by a fiber fanout enclosure as described herein.

Furthermore, although described in terms of a fiber fanout enclosure, a fiber splitter enclosure may be used in other embodiments.

Moreover, although in some embodiments, frame 103 is separated from card cage 140 by a distance, in other embodiments a protect block 210 (FIG. 8A) may have its own connectors 210A and 210B that are directly plugged into the corresponding copper connectors in back plane 149 of card cage 140, thereby to eliminate the need for cables 150A and 150B (FIG. 6B). For example, as illustrated in FIGS. 8A–8D, cables 150C and 150D may be directly plugged into such a protect block 210 at the bottom thereof.

Furthermore, when replaced, there may be two (or more) fiber fanout enclosures that occupy the space released by a protect block. The enclosures could be either two vertically stacked two line card wide enclosures or alternatively two horizontally stacked one line card wide enclosures. Also, a structural extension 211 may be attached to card cage 140 (FIG. 8C), to provide support for protect blocks and fiber fanout enclosures.

Also, in an alternative embodiment, a protector block is not required, e.g. the copper protection modules are not plugged into a block and instead, are simply mounted in holes of a panel. Such a panel could be replaced with fiber fanout enclosures and adapters (either in a module or individually).

Therefore, numerous such modifications and adaptations of the embodiments and implementations described herein are encompassed by the attached claims.

What is claimed is:

1. A method of reusing space to support copper to fiber migration of a communication network, the method comprising:
    removing from a remote terminal of the communication network, a block containing an array of connectors for protector modules;
    prior to removal, pivoting the block from a vertical to a horizontal position;
    decoupling the block from a line card;
    installing in a space at least partially occupied by the block, an enclosure containing a fan out of optical fibers; and
    pivoting the block back from the horizontal position to the vertical position.

2. The method of claim 1 wherein:
    prior to removal, the array of connectors was electrically connected to at least one line card by a plurality of copper wires; and
    the method further comprises decoupling the plurality of copper wires from the line card by disconnecting a connector.

3. The method of claim 2 wherein:
    the plurality of copper wires are hereinafter "first plurality of copper wires"; and
    prior to removal, the array of connectors was also electrically connected to a second plurality of copper wires; and
    the method further comprises severing the second plurality of copper wires from the block or moving the second plurality of copper wires through the space previously occupied by the block.

4. The method of claim 1 wherein:
    the removing comprises unfastening a plurality of fasteners that attach the block to a frame; and
    the installing comprises fastening the same plurality of fasteners to attach the enclosure to the frame.

5. The method of claim 1 wherein:
    the block and the enclosure have approximately the same footprint.

6. The method of claim 1 further comprising:
    coupling at least a group of adapters in the enclosure to a fiber optic line card.

7. The method of claim 6 further comprising:
    prior to the coupling, replacing a copper line card, previously present in the remote terminal, with the fiber optic card.

8. The method of claim 1 further comprising:
repeating the removing and the installing until a majority of the protector modules in the remote terminal are replaced by adapters.

9. The method of claim 8 further comprising:
replacing a majority of copper line cards previously present in the remote terminal with fiber optic cards.

10. A method of reusing space to support copper to fiber migration of a communication network, the method comprising:
removing from a remote terminal of the communication network, a block containing an array of connectors for protector modules; and
installing in a space at least partially occupied by the block, an enclosure containing a fan out of optical fibers;
wherein the block is in a first position relative to a line card, during normal operation of the remote terminal;
the method further comprises moving the block from the first position into a second position prior to removal, the block remaining electrically connected to said line card during the movement.

11. The method of claim 10 further comprising:
decoupling the block from said line card while the block is in the second position; and
moving the block back from the second position into the first position subsequent to decoupling and prior to removal.

12. The method of claim 10 wherein:
prior to removal, the array of connectors was electrically connected to at least one line card by a plurality of copper wires; and
the method further comprises decoupling the plurality of copper wires from the line card by disconnecting a connector.

13. The method of claim 12 wherein:
the plurality of copper wires are hereinafter "first plurality of copper wires"; and
prior to removal, the array of connectors was also electrically connected to a second plurality of copper wires; and
the method further comprises severing the second plurality of copper wires from the block or moving the second plurality of copper wires through the space previously occupied by the block.

14. The method of claim 10 wherein:
the removing comprises unfastening a plurality of fasteners that attach the block to a frame; and
the installing comprises fastening the same plurality of fasteners to attach the enclosure to the frame.

15. The method of claim 10 wherein:
the block and the enclosure have approximately the same footprint.

16. The method of claim 10 further comprising:
coupling at least a group of adapters in the enclosure to a fiber optic line card.

17. The method of claim 16 further comprising:
prior to the coupling, replacing a copper line card, previously present in the remote terminal, with the fiber optic card.

18. The method of claim 10 further comprising:
repeating the removing and the installing until a majority of the protector modules in the remote terminal are replaced by adapters.

19. The method of claim 18 further comprising:
replacing a majority of copper line cards previously present in the remote terminal with fiber optic cards.

20. A method of reusing space in upgrading a communication network, the method comprising:
removing from a remote terminal in the communication network, a first communication hardware comprising a copper protector module;
installing in a space that was at least partially occupied by the first communication hardware, a second communication hardware comprising a fiber optic adapter;
decoupling the first communication hardware from a line card in a card cage of the remote terminal;
pivoting the first communication hardware from a first position to a second position before decoupling; and
pivoting the first communication hardware from the second position to the first position after decoupling.

21. The method of claim 20 wherein the remote terminal comprises a frame having a plurality of openings, and wherein:
the first communication hardware is mounted in a first opening, prior to said removing; and
the second communication hardware is mounted in said first opening, subsequent to said installing.

22. The method of claim 20 wherein:
the first communication hardware comprises a copper cable; and
the second communication hardware comprises a fiber optic cable.

* * * * *